United States Patent
Brunner et al.

(10) Patent No.: US 10,046,846 B2
(45) Date of Patent: Aug. 14, 2018

(54) METHOD FOR MANUFACTURING A SHELL COMPONENT FOR AN AIRCRAFT OR SPACECRAFT

(71) Applicant: Airbus Operations GmbH, Hamburg (DE)

(72) Inventors: Stefan Brunner, Kuenzing (DE); Wolfgang Schulze, Hasloh (DE); Memis Tiryaki, Jork (DE); Wolfgang Eilken, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 546 days.

(21) Appl. No.: 14/617,389

(22) Filed: Feb. 9, 2015

(65) Prior Publication Data
US 2015/0225064 A1    Aug. 13, 2015

(30) Foreign Application Priority Data
Feb. 10, 2014    (EP) .................................. 14154486

(51) Int. Cl.
| | |
|---|---|
| *B64G 1/22* | (2006.01) |
| *B64C 1/12* | (2006.01) |
| *B64C 1/06* | (2006.01) |
| *B64C 3/26* | (2006.01) |
| *B64F 5/10* | (2017.01) |

(52) U.S. Cl.
CPC .............. *B64C 1/12* (2013.01); *B64C 1/068* (2013.01); *B64C 3/26* (2013.01); *B64F 5/10* (2017.01); *B64G 1/22* (2013.01); *B23P 2700/01* (2013.01); *Y10T 29/49622* (2015.01); *Y10T 29/5397* (2015.01)

(58) Field of Classification Search
CPC .... B64C 1/12; B64C 3/26; B64F 5/10; B64G 1/22; B23P 2700/01; Y10T 29/5397; Y10T 29/49622
See application file for complete search history.

(56) References Cited

U.S. PATENT DOCUMENTS

2009/0282668 A1    11/2009    Alvarez

FOREIGN PATENT DOCUMENTS

| | | |
|---|---|---|
| GB | 943915 | 12/1959 |
| WO | WO 2009/037005 | 3/2009 |

OTHER PUBLICATIONS

European Search Report for Application No. 14154486.6 dated Jul. 1, 2014.

*Primary Examiner* — Sarang Afzali
*Assistant Examiner* — Ruth G Hidalgo-Hernande
(74) *Attorney, Agent, or Firm* — Jenkins, Wilson, Taylor & Hunt, P.A.

(57) ABSTRACT

A method of manufacturing a shell component for an aircraft or spacecraft includes positioning a skin panel, which includes a skin of the aircraft or spacecraft and first and second stringers stiffening the skin, opposite a frame having first and second mouseholes for receiving the first and second stringers, elastically bending the skin panel, inserting the first stringer into the first mousehole, and releasing the elastic bend to insert the second stringer into the second mousehole.

13 Claims, 6 Drawing Sheets

METHOD FOR MANUFACTURING A SHELL COMPONENT FOR AN AIRCRAFT OR SPACECRAFT

CROSS-REFERENCE TO RELATED APPLICATION

This application claims priority to EP 14 154486.6 filed Feb. 10, 2014, the entire disclosure of which is incorporated by reference herein.

TECHNICAL FIELD

The present disclosure relates to a method for manufacturing a shell component for an aircraft or spacecraft. Furthermore, the disclosure herein relates to an apparatus for manufacturing such a component.

BACKGROUND

Although applicable to arbitrary shell components, being for example in the case of shell components for a spacecraft particularly applicable to components for elongate objects such as rocket stages, space station modules or satellites, the disclosure herein and underlying problem will be described with reference to components of the fuselage shell of an aircraft.

Conventionally, manufacturing of such shell components involves riveting or welding stringers and frame-mounting clips or angles onto a skin panel intended to form a portion of the outer skin of the aircraft shell. In further steps, frames are positioned above the stringers and riveted to the clips. This process permits flexible repositioning of the frame within the plane perpendicular to the aircraft axis, due to the separation of clips and frames at this stage. However, the subsequent application of a large number of rivets in geometrically constrained locations in order to connect the frame in its desired position to the clips renders this process very labour-intensive and difficult to automate. Furthermore, the large number of clips and rivets contributes to the weight of the aircraft due to overlapping of clips and frames, as well as to the cost of the aircraft due to additional assembly required for attaching the clips.

As an alternative, the use of integral frames is known that include an integrated foot section with contact surfaces for contacting the aircraft skin between the stringers, such that separate clips and labour-intensive operations for connecting clips and frames are unnecessary. In integral frames, the contact surfaces of the foot section are separated by so-called mouseholes, which are holes or recesses formed in the foot section at each position where a stringer crosses the frame. During the assembly of an integral frame with a skin-stringer panel, the frame has to be placed on the panel such that the stringers fit into the mouseholes of the frame.

However, because typically the outer skin of an aircraft is curved such that neighboring mouseholes are oriented in different directions, geometrical constraints severely limit or prevent repositioning of the integral frame in the plane perpendicular to the aircraft axis during assembly, to introduce the stringers into its mouseholes, unless the mouseholes are made large and/or the frame is divided into short segments. Larger mouseholes are undesirable because they lead to an increased risk of local bulging in the outer skin. On the other hand, a division of the frame into shorter segments leads to increased weight of the aircraft in addition to complicating manufacturing due to a larger number of and segment connections.

SUMMARY

It therefore is an idea of the present disclosure to reduce the weight of the shell component without increased risk of local bulging in the skin, in particular through a simple manufacturing process.

An idea underlying the present disclosure is that, in order to manufacture a shell component for an aircraft or spacecraft, a skin panel, which includes a skin of the aircraft or spacecraft and first and second stringers stiffening the skin, is positioned opposite a frame having first and second mouseholes for receiving the first and second stringers, the skin panel is elastically bent, the first stringer is inserted into the first mousehole, and the elastic bend is released to insert the second stringer into the second mousehole.

In this way, the bending of the skin panel enables the first stringer to be introduced into the first mousehole without requiring the second stringer to be introduced into the second mousehole at the same time, while the release of the bending of the skin panel enables the second stringer to be introduced into the second mousehole without requiring the first stringer to be introduced into the first mousehole at the same time. Therefore, it becomes possible to design the first and second mouseholes with small sizes, to prevent local skin bulging, without requiring a division of the frame into short segments e.g. between the first and second mousehole. This enables to achieve a favorable strength-to-weight ratio of the shell component while simplifying the manufacturing process such that manufacturing cost can be reduced because an assembly involving connection of several short frame segments is unnecessary. As a further advantage, longer frame segments ensure a high precision of the outer contour of the aircraft or spacecraft.

Also, the inventive method is suitable for automation because the bending, inserting and releasing operations can conveniently be performed from the outside without being constrained by shortage of space on the interior side of the shell component. Therefore, the method disclosed herein can be performed by for example a robot or other apparatus that can conveniently positioned without size considerations.

The inventive manufacturing apparatus comprises a positioning unit for positioning a skin panel, which includes a skin of the aircraft or spacecraft and first and second stringers stiffening the skin, opposite a frame having first and second mouseholes for receiving the first and second stringers, a bending unit for elastically bending the skin panel, an inserting unit for inserting the first stringer into the first mousehole, and a control unit, which controls the bending unit to release the elastic bend in order to insert the second stringer into the second mousehole. This allows the second stringer to be inserted into the second mousehole in an easy, automated way.

Advantageous developments and improvements of the disclosure herein are given in the dependent claims.

According to an embodiment, the frame comprises a curved contact surface for contacting the skin, the method further comprising providing the skin with a curvature to fit the contact surface. For example, the skin may be prepared by imparting the curvature to a flat metal sheet by rolling, or may be manufactured e.g. from fibre-reinforced plastic comprising the curvature from the beginning. Because of this, the skin comes to precisely conform to the contact surface after simply releasing the elastic bend.

An asymmetric outline of the second mousehole may include, on the side facing the first mousehole, a perpendicular outline portion extending substantially perpendicular to the contact surface. In this way, the second mousehole can be made particularly small with a profile that becomes narrower toward the contact surface. Namely, an asymmetric profile is enabled to be chosen for the second stringer wherein a stringer web extends substantially perpendicularly from the skin on the side of the second stringer that faces the first stringer, and a flange of the second stringer extends from the stringer web to the side of the second stringer that faces away from the first stringer.

According to an embodiment, the skin panel further includes a first reverse stringer symmetric to the first stringer with respect to a symmetry plane of the skin panel, the step of inserting the first stringer involving simultaneously inserting the first reverse stringer into a first reverse mousehole of the frame. In this way, the method can be performed particularly efficiently by choosing mirror-symmetric profiles for the stringers and mouseholes that enable simultaneous insertion, e.g. at the top centre location of the aircraft.

According to an embodiment, the skin panel further includes a second reverse stringer on a side of the first stringer facing away from the second stringer, while the method further comprises inserting the second reverse stringer into a second reverse mousehole of the frame, after inserting the first stringer. Because the first stringer is located on the skin panel between the second stringer and the second reverse stringer, this enables to start inserting stringers of the skin panel into corresponding mouseholes from a stringer that is located amidst other stringers, including e.g. a stringer close to a centre of the skin panel. In this way, it becomes possible to select the first stringer from among the stringers of the skin panel in such a way that elastic deformations occurring during the performance of the method, assembly tolerances etc. are distributed as evenly as possible over the skin panel, thereby enabling the frame to comprise a particularly long frame segment. For example, the second reverse stringer may be symmetric to the second stringer with respect to a symmetry plane of the skin panel. In this way, a single skin panel is enabled to be conveniently attached to a large, symmetric frame portion such as at the top centre location of the aircraft.

According to an embodiment, elastically bending the skin panel comprises introducing an outward bend directed away from the frame. In this way, the skin panel can be moved away from the frame in a location other than the first mousehole, thus enabling the first stringer to be introduced into the first mousehole in cases where this introduction would otherwise lead to a collision between the skin panel and the frame in the location. For example, the outward bend may be introduced into the skin between the first stringer and the second stringer, thus enabling the second stringer to be moved away from the frame in a case where it would otherwise collide with the frame. For example, the position where the outward bend is introduced may be closer to the first stringer. This has the effect that the second stringer can be moved by a large extent from the frame with only a small bend, e.g. within the elastic limit.

According to an embodiment, elastically bending the skin panel comprises introducing an inward bend directed toward the frame. This enables the second stringer to be introduced into the second mousehole in cases where its orientation would otherwise not allow the introduction. Thus, the second mousehole can be given a particularly narrow shape, leading to a further improved strength-to-weight ratio of the shell component. For example, the inward bend may be introduced into the skin between the first stringer and the second stringer in a position closer to the second stringer. In this way, the second stringer can be tilted into the required orientation without bringing it substantially closer to the frame, e.g. in cases where this would otherwise let the second stringer collide with the frame outside the second mousehole. Thus, the second mousehole can be given an even narrower shape.

According to an embodiment, elastically bending the skin panel is performed at least partly before the step of inserting the first stringer into the first mousehole. This enables the method to be implemented with particularly simple movements, by at least partly separating the movements required for the bending and inserting steps.

According to an embodiment, elastically bending the skin panel is performed at least partly simultaneously with the step of inserting the first stringer into the first mousehole. This enables the method to be performed particularly quickly.

According to an embodiment, the method further comprises arranging the frame. For example, the frame is arranged in a tool, which fixes it and ensures the outer contour of the aircraft. For example, the step of arranging the frame is performed before the step of positioning the skin panel, for greater precision. Also, a plurality of frames having respective first and second mouseholes for receiving the first and second stringers may be arranged, the skin panel may be positioned opposite each frame, the first stringer may be inserted into each first mousehole, and the elastic bend may be released to insert the second stringer into each second mousehole. In this way, larger shell components extending over more than one frame can be efficiently manufactured.

According to an embodiment of the inventive apparatus, the positioning unit comprises a plurality of suction cups for holding the skin panel, the bending unit including a drive for independently moving the suction cups to perform the elastic bending of the skin panel. This enables the skin panel to be handled gently regardless of its material.

BRIEF DESCRIPTION OF THE DRAWINGS

Embodiments of the disclosure herein will be described below with reference to the drawings, in which.

In the drawings, same reference signs denote same constructional elements, unless explicitly indicated otherwise.

DETAILED DESCRIPTION

Figure 1:
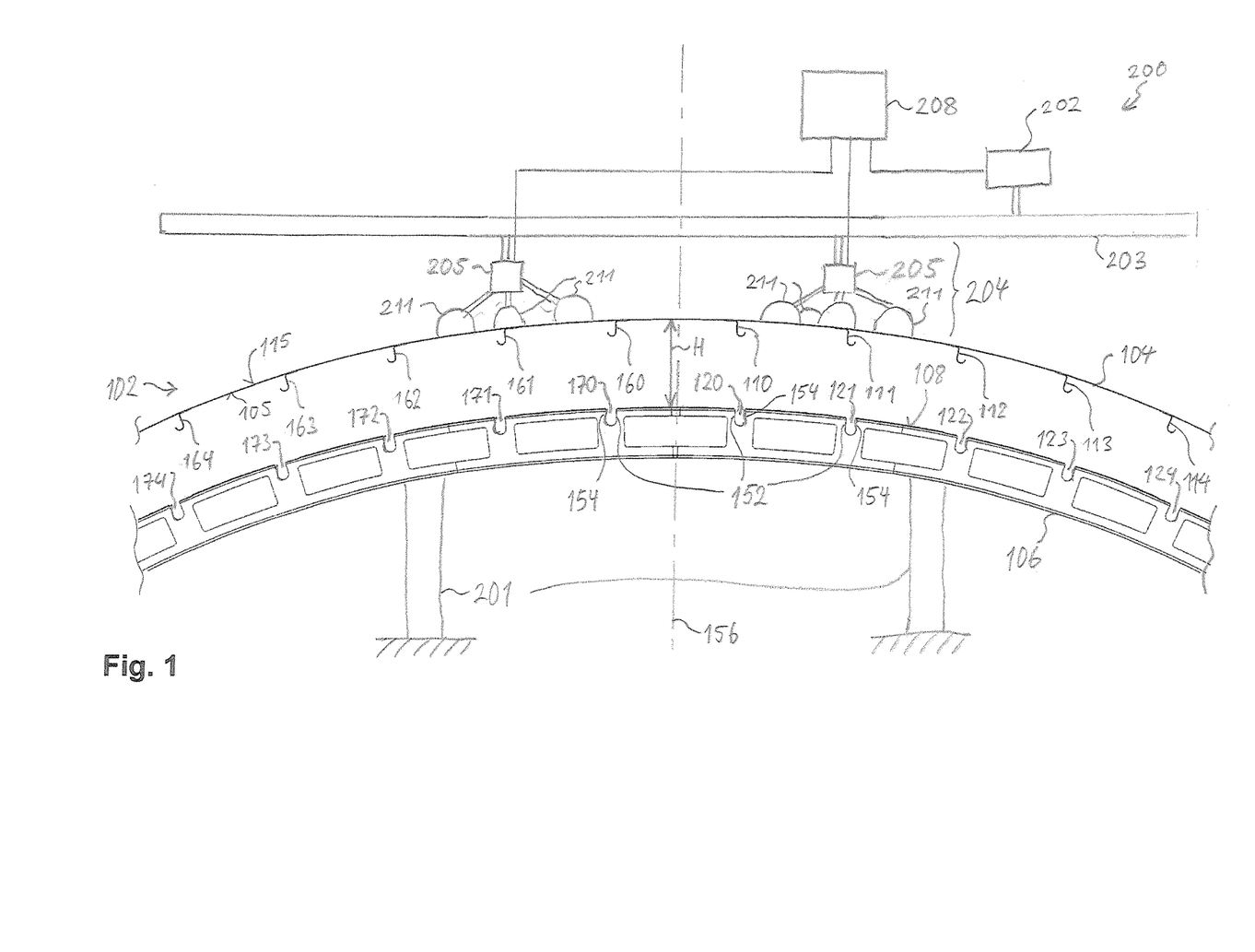
FIG. 1 is a schematic planar side view of a manufacturing apparatus according to an embodiment of the disclosure herein, during performance of a method, according to an embodiment, for manufacturing a shell component for an aircraft or spacecraft.

FIG. 1 shows, in a schematic planar side view, a manufacturing apparatus 200 for manufacturing a shell component for an aircraft or spacecraft by joining a skin panel 102, which is exemplarily shown to consist of a convexly curved skin 104 portion of the aircraft or spacecraft and a plurality of stringers 110-114, 160-164 affixed to an inner surface 105 thereof, to an integral frame 106, which has a correspondingly convexly curved contact surface 108 for contacting the inner surface 105 of the skin 104 and a plurality of mouseholes 120-124, 170-174, formed in the contact surface 108 in the shape of mouseholes, for respectively receiving each of the stringers 110-114, 160-164 therein. The frame 106 is not limited to any particular type of cross-section and may be configured e.g. as a Z-, F-, E-, Ω- or J-frame. Both the skin panel 102 and the frame 106 are shown to be mirror-symmetric with respect to a symmetry plane 156, which in the present example corresponds to the main symmetry plane of an aircraft for which the shell component is intended to be manufactured.

The frame 106 is shown in a state where it has been mounted on a frame support tool 201 comprised by the manufacturing apparatus 200 in order to rigidly support the frame 106 in a predetermined position. In FIG. 1, the frame 106 is shown oriented parallel to the drawing plane with its contact surface 108 pointing upward and the symmetry plane 156 oriented perpendicular to the drawing plane.

The manufacturing apparatus 200 further comprises a positioning unit 203 for positioning the skin panel 102 opposite the contact surface 108 of the frame 106. The positioning unit 203 can be a suspension beam that suspends the skin panel 102 from e.g. a ceiling (not shown) above the frame support tool 201 in an aligned fashion such that each stringer 110-114, 160-164 is positioned above a corresponding one of the mouseholes 120-124, 170-174.

Furthermore, the manufacturing apparatus 200 comprises an inserting unit 202 for inserting at least one of the stringers 110-114, 160-164 into the corresponding one of the mouseholes 120-124, 170-174 when the skin panel 102 has been positioned by the positioning unit 203. In the present embodiment, the inserting unit 202 is a drive that lowers the positioning unit 203 with the skin panel 102 toward the frame 106 in order to introduce the at least one of the stringers into the corresponding mousehole.

The manufacturing apparatus 200 furthermore comprises a bending unit 204 for elastically bending the skin panel 102 at predetermined locations. The bending unit 204 includes a plurality of suction cups 211 for attaching to the outer surface 115 of the skin 104 in predetermined locations as well as a plurality of drives 205 for positioning the suction cups 211 relative to each other in order to introduce bending forces into the skin 104. FIG. 1 for ease of representation schematically shows two drives 205 controlling three suction cups 211 each. However, the bending unit 204 is assumed to be configured with as many drives 205 and suction cups 211 as needed to elastically bend the skin panel 102 at the predetermined locations. For example, for each predetermined bending location the bending unit 204 may comprise one drive 205 and three suction cups 211 controlled by the drive 205. In the present embodiment, the bending unit 204 furthermore serves to attach the skin panel 102 to the positioning unit 203.

Moreover, the manufacturing apparatus 200 comprises a control unit 208, which is configured to control the overall operation of the manufacturing apparatus 200. In particular, the control unit 208 is configured to control the inserting unit 202 such that the at least one of the stringers 110-114, 160-164 is inserted into the corresponding one of the mouseholes 120-124, 170-174. Furthermore, the control unit 208 is configured to control the drives 205 and suction cups 211 of the bending unit 204 to cause an elastic bend of the skin panel 102 in at least one predetermined location, and also to release the elastic bend in order to insert at least a second one of the stringers 110-114, 160-164 into a corresponding second one of the mouseholes 120-124, 170-174.

FIG. 1 depicts the manufacturing apparatus 200 in a state where it has, by using its positioning unit 203 under the control of its control unit 208, positioned the skin panel 102 at a height H above the frame 106, the skin panel 102 being aligned with respect to the frame 106 in such a way that all stringer 110-114, 160-164 are located exactly above the respective corresponding one of the mouseholes 120-124, 170-174. For example, the height H is set to a predetermined value such as 160 mm.

In this sense, FIG. 1 illustrates not only a manufacturing apparatus according to an embodiment but also Step 1 of a manufacturing method of a shell component for an aircraft or spacecraft according to an embodiment of the disclosure herein. Further steps of the method will in the following be explained by making reference to FIGS. 2 to 9. For ease of representation, the manufacturing apparatus 200, although present, has been omitted from FIGS. 2 to 9. Furthermore, because both the frame 106 and the skin panel 102 are mirror-symmetric with respect to the symmetry plane 156, only one half of the frame 106 and the skin panel 102 is depicted in FIGS. 2 to 9, with the assumption that the respective method steps are performed symmetrically in both halves.

As can be seen e.g. in FIG. 1, each stringer 110-114, 160-164 comprises an asymmetric profile resembling the shape of a walking cane or the capital letter "J". In both halves of the skin panel 102, the profile of the stringers 110-114, 160-164 is oriented such that a perpendicular stringer web, which is substantially perpendicular to the skin 104, of the "J"-profile faces toward the symmetry plane 156. It is noted that in alternative embodiments the shape of the profile of one or more of the stringers 110-114, 160-164 may differ, e.g. resemble the shape of the capital letter "Z" or the Greek capital letter "Ω". Correspondingly, the mouseholes 120-124, 170-174 each comprise an asymmetric outline with a perpendicular outline portion 152 extending substantially perpendicular to the contact surface 108 on the side facing toward the symmetry plane 156. On the side facing away from the symmetry plane 156, the outlines of the mouseholes 120-124, 170-174 have narrowing outline portions 154 that are tilted with respect to the contact surface 108 in such a way that the mouseholes 120-124, 170-174 become narrower in the vicinity of the contact surface 108.

Figure 2:
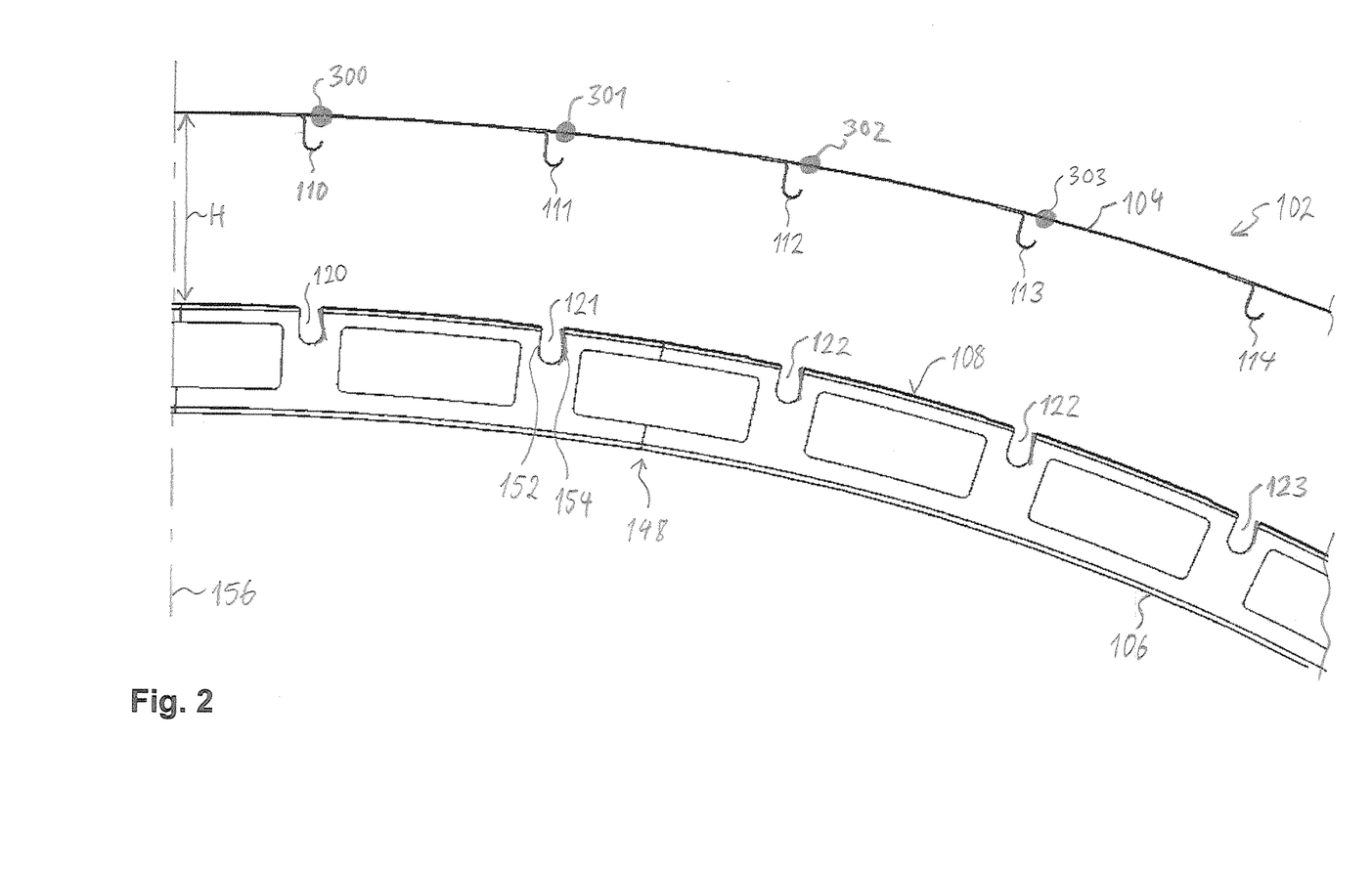
FIGS. 2-9 are schematic planar side views illustrating further steps of the method for manufacturing a shell component for an aircraft or spacecraft.

FIG. 2 illustrates Step 2 of the manufacturing method that follows after the step depicted in FIG. 1. In this step, while keeping the height H at the symmetry plane 156 constant, by the bending unit as controlled by the control unit the skin 104 of the skin, panel 102 is elastically bent in four bending locations 300-303 by e.g. 1° each into the direction away from the contact surface 108 of the frame 106. The bending locations 300-301 are located closely behind the first four stringers 110-113 as seen from the symmetry plane 156. After the elastic bending, the resulting elastic bends are retained by retaining the forces exerted by the bending unit. The bending locations 300-303 are marked in FIG. 2 by full-circle markers, which throughout the Figures signify that an elastic bend away from the contact surface (as seen from the symmetry plane 156) has been newly introduced in the method step depicted by the respective figure.

Figure 3:
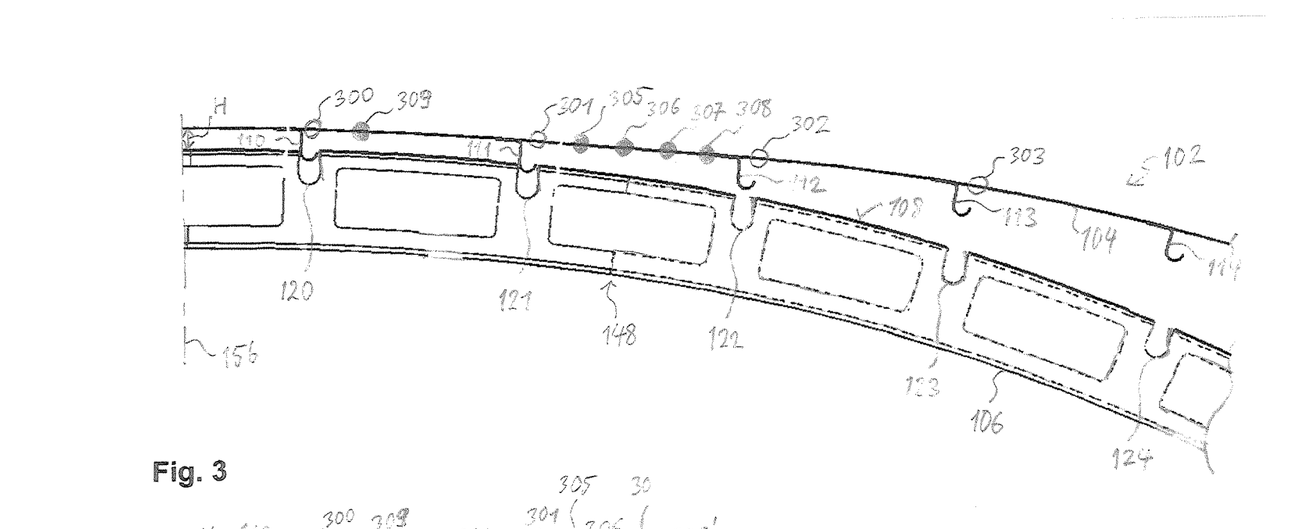

Subsequent Step 3 is illustrated in FIG. 3. In this step, the elastic bends 300-304 introduced in the previous method step are retained. Throughout the figures, elastic bends away from the contact surface (as seen from the symmetry plane 156) that are retained from previous method steps are indicated by open circle markers. Additionally, a further elastic bend 309 of e.g. 1° directed away from the frame 106 is introduced between the stringer 110 closest to the symmetry plane 156 (to be called zeroth stringer 110 below) and the neighboring first stringer 111 in a bend location distanced from the zeroth stringer 110 by about one quarter of the distance between the zeroth and first stringers 110, 111. Between the first and second stringers 111, 112, where a curvature radius change 148 of the contact surface 108 occurs, four new elastic bends 305-308 of e.g. 1° each in the direction away from the frame 106 are introduced, approximately evenly spaced between the previously introduced elastic bend 301 and the second stringer 112.

Simultaneously or beforehand, the height H of the skin panel 102 above the frame 106 is reduced to e.g. 20 mm by action of the inserting unit as controlled by the control unit. In consequence, the zeroth stringer 110 is inserted partially into the corresponding zeroth mousehole 120, and the first stringer 111, which has been lifted relative to the zeroth stringer 110 by the two elastic bends 300, 309 between the zeroth and first stringers 110, 111, is introduced to a lesser degree into the corresponding first mousehole 121. Since the method steps are performed symmetrically on both sides of the symmetry plane as mentioned above, the zeroth reverse stringer 160 is partially inserted into the corresponding zeroth reverse mousehole 170 simultaneously with the zeroth stringer 110 being inserted partially into the corresponding zeroth mousehole 120, and the and the first reverse stringer 161 is introduced to into the corresponding first reverse mousehole 171 at the same time and to the same degree as the first stringer 111 is introduced into the corresponding first mousehole 121. Note that the second stringer 112, due to having been lifted relative to the zeroth stringer 110 by seven elastic bends 300, 301, 305-309 away from the frame 106, is prevented from colliding with the contact surface 108.

Figure 4:
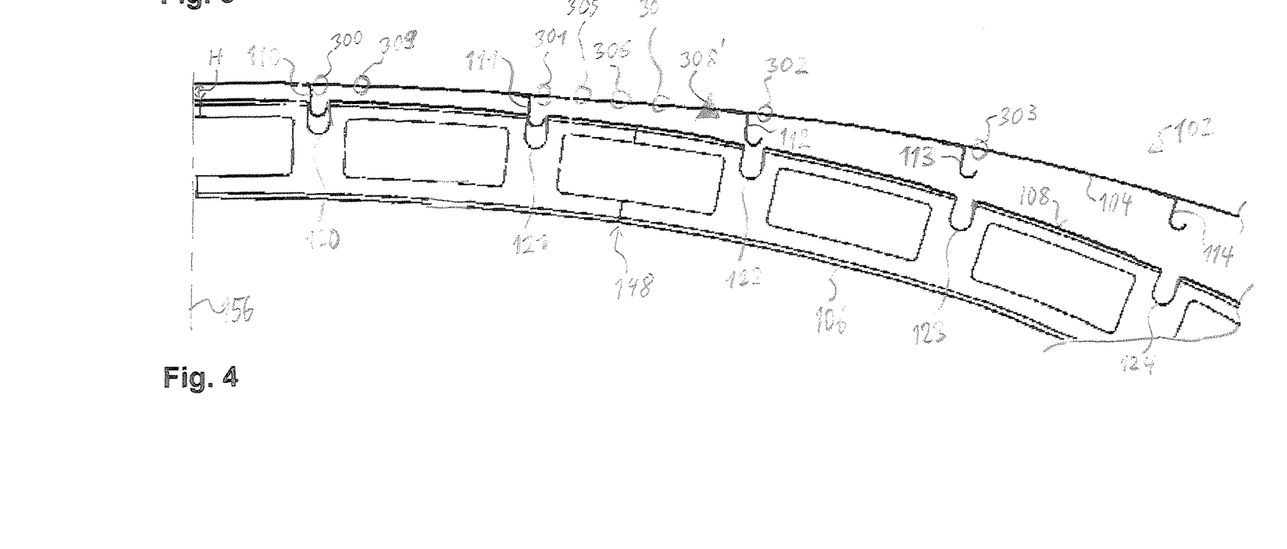

FIG. 4 illustrates subsequent Step 4 of the method. In this step, the height H is further reduced to e.g. 15 mm, before the outward elastic bend 308 introduced in the previous step is released and replaced by an inward elastic bend 308' by e.g. 1°, i.e. an elastic bend that, as seen from the symmetry plane 156, elastically bends the skin 104 by this amount toward the frame 106. This rotates the second stringer 112, which in the previous step, based on the exemplary bending amounts given above, had been rotated by an exemplary total of 7° against the orientation of the corresponding second mousehole 122, into an orientation that deviates only by an exemplary total of 5° from the orientation of the second mousehole 122. The inward elastic bend 308' is marked in FIG. 4 as newly introduced by a full-triangle marker, and in the following figures as previously introduced by an open-triangle marker.

Figure 5:
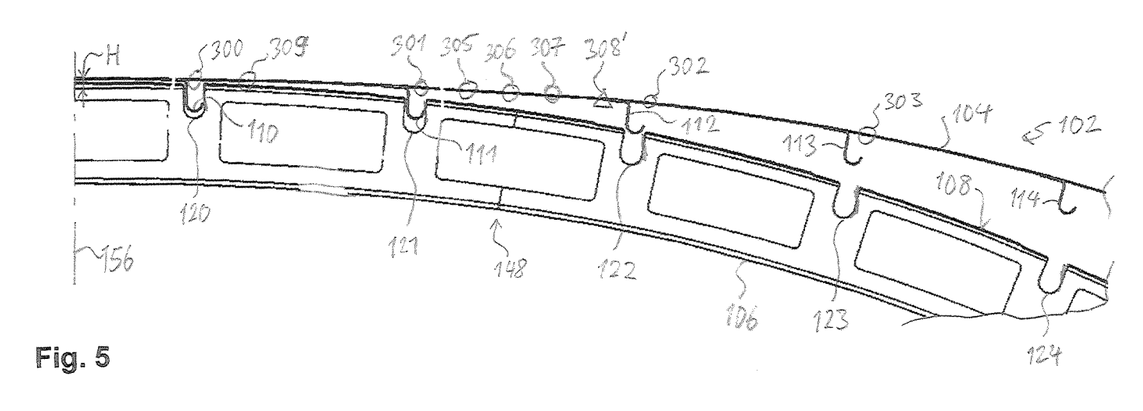

In Step 5 as illustrated by FIG. 5, the inserting unit under the control of the control unit lowers the skin panel 102 to further reduce the height H at the symmetry plane 156, above the aircraft centre, to e.g. 4 mm. This results in a farther insertion of the zeroth and first stringers 110, 111 in their respective mouseholes 120, 121 while the second stringer 112 begins its insertion into the second mousehole 122.

Figure 6:
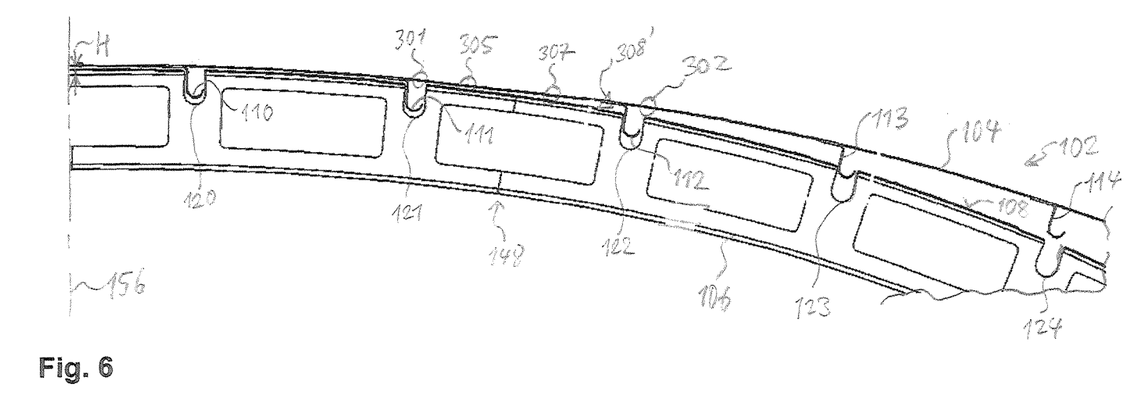

In Step 6 as illustrated by FIG. 6, all elastic bends 300, 309 between the zeroth and first stringers 110, 111 are released, such that the skin panel 102 assumes its original shape in the interval between the symmetry plane 156 and the first stringer 111. This release results in a farther insertion of the first stringer 111 into the first mousehole 121 and the second stringer 112 into the second mousehole 122.

Figure 7:
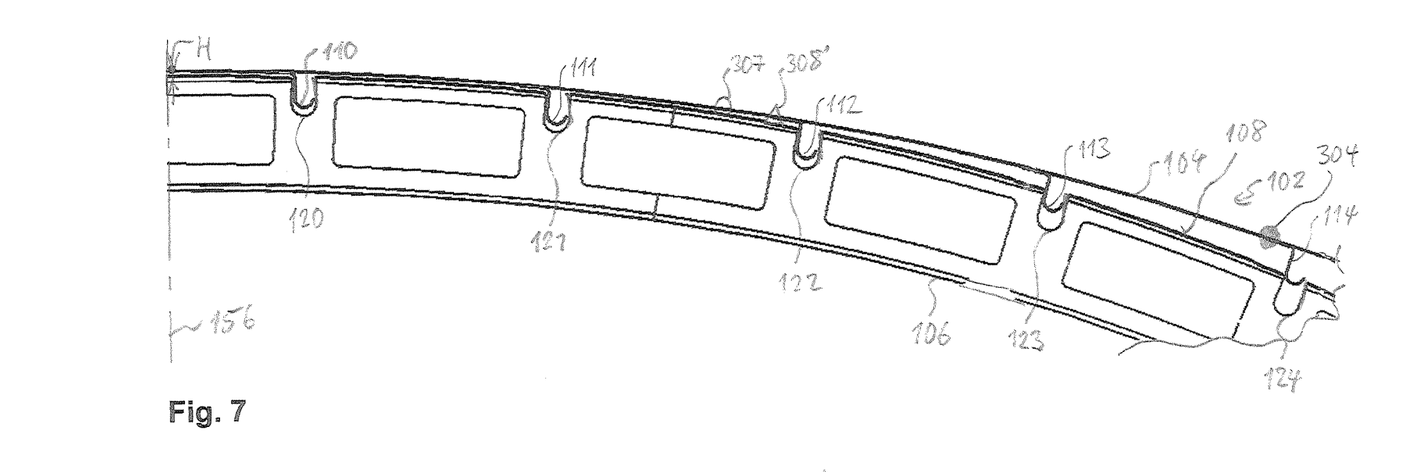

In Step 7, as illustrated by FIG. 7, a new downward elastic bend 304 by e.g. 1° is introduced at a location immediately preceding the fourth stringer 114, as seen from the symmetry plane 156, in order to prevent a collision of the fourth stringer 114 with the frame 106. All other elastic bends 301, 305, 302 are released, except the upward and downward elastic bends 307, 308', which immediately precede the second stringer 112. The release introduces the second stringer 112 farther into the second mousehole 122. Because the remaining elastic bends 307, 308' are of opposite direction, the angular orientation of the second stringer 112 now exactly agrees with the orientation of the second mousehole 122.

Figure 8:
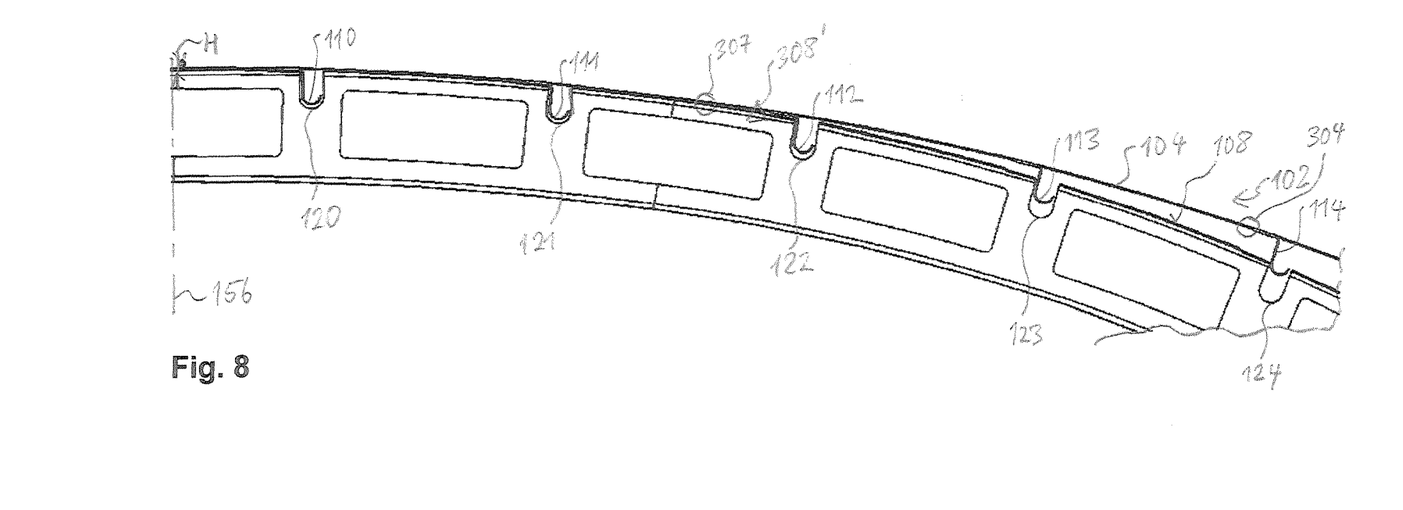

In Step 8, as illustrated by FIG. 8, the height H at the symmetry plane 156 is reduced to 0 mm, thus bringing the zeroth and first stringers 110, 111 into their final positions with respect to the frame 106.

Figure 9:
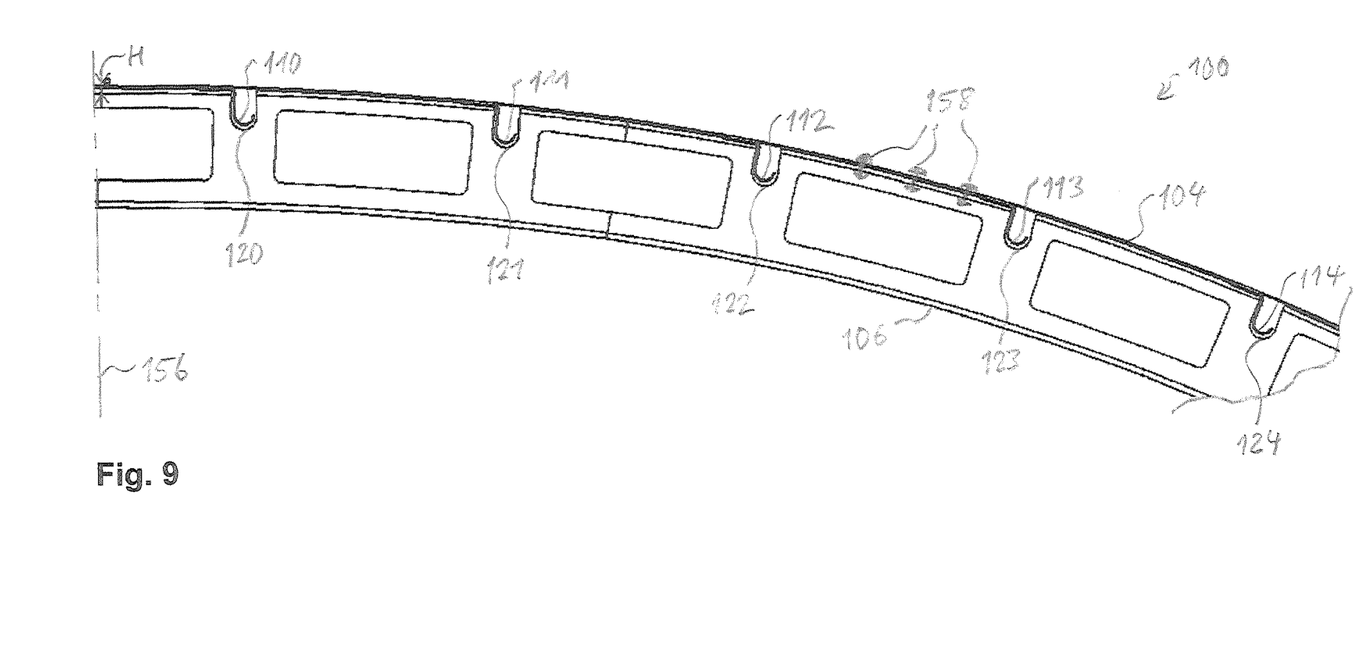

In Step 9, as illustrated by FIG. 9, the last three remaining elastic bends 304, 307, 308' are released, thus bringing all stringers 110-114 into their respective final positions with respect to the frame 106. Subsequently, the skin panel 102 is affixed by rivets 158 to the frame 106. Although only three rivets 158 are shown as an example, the affixation is performed along the entire length of the skin panel 102 in contact with the contact surface 108.

In the above-described embodiment, insertion of stringers 110-114, 160-164 into their corresponding mouseholes 120-124, 170-124 begins from the location of the symmetry plane 156 of the frame 106, such that the zeroth stringer 110 and the zeroth reverse stringer 160, which are closest to the symmetry plane 106 are inserted first. However, in alternative embodiments different locations may be chosen from where to begin the insertion of stringers. For example, depending on the shape of the frame and the distribution of stringers on the skin panel it may be desirable to start insertion of stringers from a location where distances between neighboring stringers are smaller than in other locations, or from a location where a change in the curvature of the skin occurs, in order to achieve an even distribution of elastic bending locations and/or assembly tolerances over the entire skin panel.

While at least one exemplary embodiment of the present disclosure(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. The disclosure hereby incorporates by reference the complete disclosure of any patent or application from which it claims benefit or priority.

The invention claimed is:

1. A method of manufacturing a shell component for an aircraft or spacecraft, comprising:
   positioning a skin panel, which includes a skin of the aircraft or spacecraft and first and second stringers stiffening the skin, opposite a frame having first and second mouseholes for receiving the first and second stringers;
   elastically bending the skin panel;
   inserting the first stringer into the first mousehole; and
   releasing the elastic bend to insert the second stringer into the second mousehole.

2. The method according to claim 1, wherein elastically bending the skin panel comprises introducing an outward bend directed away from the frame.

3. The method according to claim 2, wherein the outward bend is introduced into the skin between the first stringer and the second stringer, in particular in a position closer to the first stringer.

4. The method according to claim 1, wherein elastically bending the skin panel comprises introducing an inward bend directed toward the frame.

5. The method according to claim 4, wherein the inward bend is introduced into the skin between the first stringer and the second stringer, in particular in a position closer to the second stringer.

6. The method according to claim 1, wherein the frame comprises a curved contact surface for contacting the skin, the method further comprising providing the skin with a curvature to fit the contact surface.

7. The method according to claim 1, wherein an asymmetric outline of the second mousehole includes, on a side thereof facing the first mousehole, a perpendicular outline portion extending substantially perpendicular to the contact surface.

8. The method according to claim 1, wherein the skin panel further includes a first reverse stringer symmetric to the first stringer with respect to a symmetry plane of the skin panel, and inserting the first stringer involves simultaneously inserting the first reverse stringer into a first reverse mousehole of the frame.

9. The method according to claim 1, wherein the skin panel further includes a second reverse stringer on a side of the first stringer facing away from the second stringer, the method further comprising inserting the second reverse stringer into a second reverse mousehole of the frame, after inserting the first stringer.

10. The method according to claim 1, wherein elastically bending the skin panel is performed at least partly before inserting the first stringer into the first mousehole.

11. The method according to claim 1, wherein elastically bending the skin panel is performed at least partly simultaneously with the inserting the first stringer into the first mousehole.

12. The method according to claim 1, further comprising arranging the frame before positioning the skin panel.

13. The method according to claim 1, wherein a plurality of frames having respective first and second mouseholes for receiving the first and second stringers is arranged, the skin panel is positioned opposite each frame, the first stringer is inserted into each first mousehole, and the elastic bend is released to insert the second stringer into each second mousehole.

* * * * *